March 17, 1959      D. E. MUNDT      2,878,436
ELECTRIC MOTOR AUTOMATIC RECYCLING SYSTEM
Filed May 20, 1958
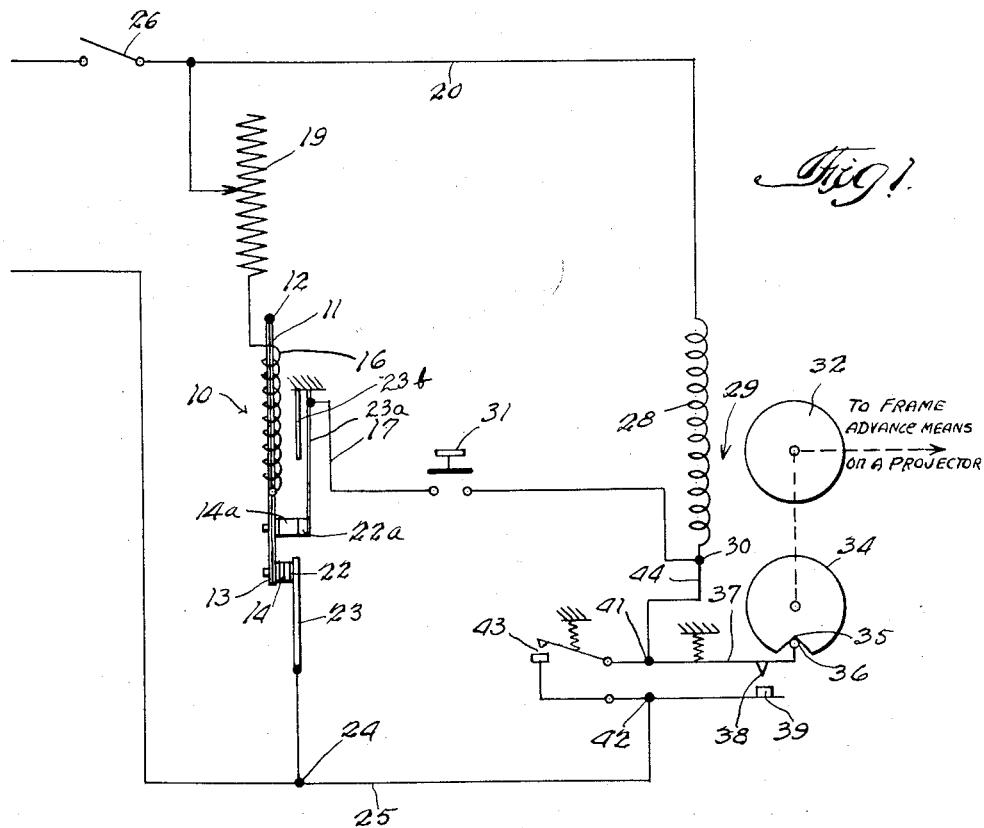
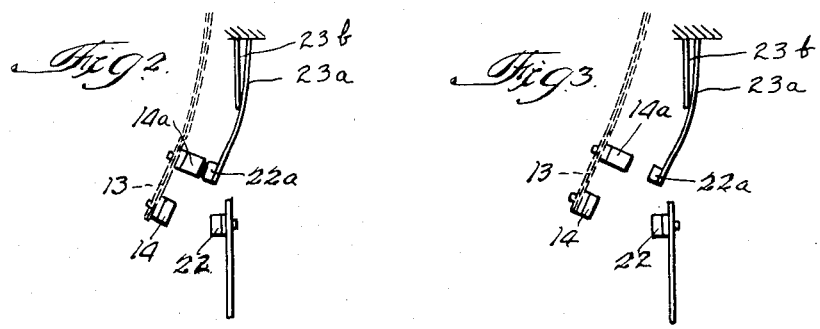
INVENTOR.
Diedrich E. Mundt
BY Robert L. Kahn
Atty.

United States Patent Office 2,878,436
Patented Mar. 17, 1959

2,878,436

ELECTRIC MOTOR AUTOMATIC RECYCLING SYSTEM

Diedrich E. Mundt, Maine Township, Cook County, Ill., assignor to "Hold-Heet" Products Corp., a corporation of Illinois Application May 20, 1958, Serial No. 736,572

11 Claims. (Cl. 318—443)

This invention relates to an automatic recycling system and more particularly to a system which may be used with devices which are to be manually or automatically cycled. While the invention will be described for use with a slide projector, it is understood that this is exemplary and that the invention may be applied to any desired device.

Slide projectors, as one example, may be provided with a power drive for advancing a slide or a frame. Generally, such power drives have a manual control so that a slide or frame may be advanced at one desired time. In addition to the manual control, it is frequently desirable to provide means for automatically cycling the drive at regular repeated intervals. This invention provides a simple and effective means for insuring such an operation.

In general, the power drive includes an electric motor and a cam operating switch for controlling the motor circuit and maintaining the motor in running condition through one operating cycle. At the end of the cycle the motor operated switch is automatically opened and the motor cuts itself off.

In theory, a motor could be kept running continuously and have suitable timing mechanism for applying power to a frame or slide advance mechanism at regular intervals. In practice, however, such an arrangement is undesirable. For one thing, a continuously running motor must have sufficient power for the job under continuous operation. The mechanism for controlling the flow of power from the motor to the frame advance mechanism would be relatively costly.

At present, the practice is to use a cheap alternating current electric motor coupled to the frame or slide advance means and normally not rated for continuous duty for that type of a load. In effect, the motor presently used is overloaded. Since it operates at intermittent though regular intervals, the average power drawn from the motor may be relatively low so that intermittent overloading is not serious.

While timers for automatically recycling such a drive are available, they are relatively costly and bulky and not too efficient. In accordance with the present invention I provide a heat responsive electric switch having a duty cycle which is shorter than the normal time cycle for the conventional motor drive. Thus, as an example, a conventional motor drive for operating a slide projector may have a duty cycle of about one second. In accordance with the present invention, my heat responsive switch will have a duty cycle of less than one second and may as an example have a duty cycle of about one-half a second. By suitably associating the heat responsive switch with the conventional motor drive system, the entire drive system will be automatically started by the heat responsive switch but be terminated by the motor control switch. The time between two successive cycles may be determined by the operating characteristics of the heat responsive switch and be varied by manual means. Means are provided for protecting the system against abuse.

In order that the invention may be understood, it will now be disclosed in connection with the accompanying drawing.

Figure 1 shows in diagrammatic form a system embodying the present invention.

Figure 2 shows the thermostatic switch in an open position for normal cycling.

Figure 3 shows the thermostatic switch with the safety contacts open.

The system includes thermostatic switch 10 having bimetal strip 11 rigidly supported at end 12 and having free end 13 provided with movable contact 14. The bimetal is so arranged that when heated the strip will generally assume the dotted line position.

Disposed in suitable relation to bimetal strip 11 is heater winding 16 having one terminal 17 grounded to the bimetal. Heater winding 16 has its other terminal 18 connected through variable resistor 19 to wire 20. Movable contact 14 of the bimetal strip cooperates with fixed contact 22 carried by some stationary support, such as arm 23. Fixed contact 22 is connected electrically to junction 24 and wire 25.

Wires 20 and 25 are adapted to be connected to a suitable source of electric power, such as for example a conventional 117 volt 60 cycle line. An on-off switch 26 may be provided for the entire system. Wire 20 is connected to one terminal of winding 28 of electric motor 29. This may be a simple induction motor. Winding 28 has its other terminal 30 connected through manual switch 31 to contact arm 23a carrying stationary contact 22a cooperating with movable contact 14a on bimetal strip 11. Contacts 14a and 22a form a pair of safety contacts as will be hereinafter explained.

Contact arm 23a is of spring material such as spring steel and tends to move contact 22a toward contact 14a. Stop plate 22b limits the movement of contact 22a so that it can remain closed against contact 14a only for normal movement of bimetal strip 11 as shown in Figure 2. If bimetal strip 11 bends even more than shown in Figure 2, due to excessive heating of the bimetal, then strip 11 can move as shown in Figure 3 to open the safety contacts 14a and 22a in addition to normal contacts 14 and 22.

Motor 29 has rotor 32 for driving frame advance means on a projector or for providing power to any suitable load to be cycled. Rotor 32 also drives cam 34 having notch 35. Cam 34 cooperates with cam follower 36 carried by arm 37 upon which there is disposed movable contact 38. Movable contact 38 cooperates with fixed contact 39, these two contacts being normally open when cam 34 is in the position shown. Upon rotation of motor 32 and turning of cam 34, contacts 38 and 39 will close when cam follower 36 leaves notch 35. It is understood that the motor drive for cam 34 and usually the load includes speed reducing means.

Contacts 38 and 39 are connected to terminals 41 and 42 respectively. Across terminals 41 and 42 is connected normally open manual switch 43. Terminals 30 and 41 are connected by wire 44. Wire 25 is connected to terminal 42.

The operation of the system is as follows:

Assuming that the various parts are as shown, and assuming that switches 26 and 31 are closed, current will flow through heater 16. Manual switch 31 is stable in either open or closed position and must normally be closed for system operation. The closure of switch 31 establishes a motor circuit from wire 20 through winding 28 through switch 31, closed contacts 22a and 14a, bimetal strip 11 and closed thermostatic switch contacts 14 and 22 to wire 25. After motor 29 starts, cam 34 closes switch contacts 38 and 39 and establishes a motor operating circuit independently of the thermostatic switch.

In the meantime, bimetal 11 of thermostatic switch 10 is becoming hot and before cam 34 makes a complete turn—as one example, about one second—contacts 14 and 22 are opened as shown in Figure 2. The opening of contacts 14 and 22 does not open the heating circuit for heater winding 16 since the circuit is completed through contacts 14a, 22a, switch 31 and closed contacts 38 and 39. Hence, heater winding 16 will remain energized as long as motor 29 is running. When motor 32 has turned cam 34 one revolution, contacts 38 and 39 open and the circuit for the motor and heater winding 16 will both be opened. As soon as bimetal strip 11 has cooled, the closure of contacts 14 and 22 re-establishes the circuits for the motor and heater winding 16 and a new operating cycle is initiated.

It will be noted that thermostatic switch 10 has an opening time for contacts 14 and 22 which is less than the time taken by cam 34 to make one complete turn. As a rule, the normal thermostatic switch cycle may be about one-half of the cam switch operating cycle. Since the heater circuit is energized while motor 29 runs, the thermostatic switch cycle duration is unimportant within the time required for the cam switch to close and then to open.

The time taken by the thermostatic switch to go from an open position for contacts 14 and 22 as shown in Figure 2 to a closed contact position as shown in Figure 1 will be determined by the radiation characteristics of the switch. This may be set to any desired time depending upon the desired idle time for the motor between successive duty cycles.

In case manual switch contacts 43 are closed too frequently or kept closed too long, heater winding 16 will heat bimetal strip 11 to an unusually high temperature and the bimetal strip will move to the position shown in Figure 3 to open safety contacts 14a and 22a. The opening of safety contacts 14a and 22a will protect the heater and the bimetal strip against damage. If it is desired to protect the motor 29 at the same time, it may be accomplished by rearranging the connections. Thus, wire 44 in Figure 1 would be omitted. Wire 17 would connect to bimetal strip 11 instead of to arm 23a. Arm 23a would be connected to terminal 41. In such case, the safety contacts 14a and 22a would not only open the heater circuit as before but would also open the circuit for motor winding 28.

What is claimed is:

1. An automatic recycling system comprising a thermostatic switch including a heater winding and a pair of contacts which are closed at one temperature and are opened at a higher temperature, said heater having one terminal connected to one of said thermostat contacts, an electric motor having a pair of terminals, a connection between one of said motor terminals and said one thermostat contact, an electric switch having normally open contacts, means controlled by said motor for closing said contacts after said motor has been energized and has started to operate, said switch closing means maintaining said contacts closed for a motor operating cycle after which said contacts are opened again, connections disposing said normally open switch contacts between said one motor terminal and the other thermostat switch contact, an electrical connection between the other terminal of the thermostat heater and the other terminal of the motor, said system being adapted to have a source of current connected between the other terminal of the heater winding and the other contact of said thermostat switch, said thermostatic switch normally having an opening operating period which is less than the operating period for the motor controlled switch.

2. An automatic recycling system comprising a thermostatic switch including a bimetallic strip carrying one thermostat contact, said thermostatic switch having another stationary contact cooperating with said movable contact, a heater winding disposed in proximity to said bimetallic strip for heating the same and having one of said heater terminals connected to the movable contact, said bimetal when cold maintaining the contacts closed and opening the contacts after said bimetal has been heated, an induction motor having two terminals, a connection between one of said motor terminals and said movable thermostatic switch contact, a connection between the other motor terminal and the other heater terminal, a connection including a normally open switch between the stationary thermostat contact and the one motor terminal, means controlled by the operation of said electric motor for closing said last named switch after said motor has started to operate and for maintaining said last named switch closed for a predetermined motor operating time after which said last named switch resumes its normal open position, said motor being adapted to drive a load to be cycled and said system being adapted to being electrically energized by connecting a power source to said stationary thermostatic switch contact and the other terminal of said heater winding, said thermostatic switch having an operating period for opening the switch contacts after the heater has been energized which is shorter than the closure time of the motor controlled switch contacts.

3. The system according to claim 2 wherein means are provided for manually completing a circuit across the motor controlled switch contacts whereby a motor operating cycle may be initiated manually independently of the thermostatic switch.

4. The system according to claim 3 wherein the connection between the one motor terminal and the movable thermostatic switch contact includes a manually controlled electric switch, said switch having stable closed or open positions and being normally closed during cycling and being opened when it is desired to interrupt the initiation of a new motor operating cycle.

5. An automatic recycling system comprising a thermostatic switch including a heater winding and a pair of contacts which are closed at one temperature and are opened at a higher temperature, said heater having one terminal connected to one thermostat contact, an electric motor of the induction type having a pair of terminals, a first connection between one motor terminal and said one thermostat contact, a second connection between the other motor terminal and the other heater terminal, a third connection between the one motor terminal and the other thermostat contact, said third connection including a normally open electric switch, a cam driven by said electric motor, means controlled by said cam for closing said normally open switch after said motor has started to operate and for maintaining said switch closed for a predetermined number of motor revolutions after which said switch assumes its normally open condition, said thermostat having its contacts normally closed but opening the same after said heater winding had been energized for a predetermined time, the contact opening time for said thermostat being substantially less than the normal closure time for the cam operated switch, said system having terminals connected to the other thermostat contact and the other heater terminal for energization by a power source, said electric motor being adapted to operate a load to be cycled.

6. The system according to claim 5 wherein a switch is interposed in the first connection for opening the same whereby said system may be indefinitely halted between cycles.

7. The system according to claim 6 wherein manually controlled means are provided for bridging said motor controlled switch to initiate a motor operating cycle independently of said thermostat.

8. An automatic recycling system comprising a thermostatic switch including a heater winding and two normally closed pairs of contacts, said thermostatic switch opening one pair of contacts at one temperature and opening the other pair of contacts at a higher temperature, said heater having one terminal connected to one of each of said two pairs of thermostat contacts, an electric motor having a pair of terminals, a connection between one of said motor terminals and the other contact of the second pair of contacts, an electric motor switch having normally open contacts, means controlled by said motor for closing the contacts of said electric motor switch after said motor has been energized and has started to operate, said motor switch closing means maintaining said contacts closed for a motor operating cycle after which said contacts are opened again, connections disposing said normally open switch contacts between said one motor terminal and the other contact of the first pair of thermostat contacts, an electrical connection between the other terminal of the thermostat heater and the other terminal of the motor, said system being adapted to have a source of current connected between the other terminal of the heater winding and the other contact of the one pair of thermostatic switch contacts, said thermostat having an operating period for opening the first pair of thermostatic contacts which is less than the operating period for the motor controlled switch.

9. An automatic recycling system comprising a thermostatic switch including a bimetallic strip, two pairs of normally closed contacts controlled by said bimetallic strip, one pair of said contacts being opened at one temperature and the second pair being opened at a higher temperature, said bimetallic strip carrying one contact of each of said two pairs of contacts, a heater winding disposed in proximity to said bimetallic strip for heating the same and having one of said heater terminals connected to the contacts on said strip, the other pair of switch contacts having the remaining contact carried on a spring arm, said spring arm tending to move its contact toward the cooperating contact but having means to limit the movement thereof so that said second pair of contacts will open only after said first pair of contacts have opened and after the temperature of the bimetallic strip has continued to increase, an induction motor having two terminals, one of said motor terminals being a system terminal, a connection between the other motor terminal and the spring mounted contact of the second pair of contacts, a connection including a normally open motor switch between the stationary thermostat contact of the first pair and the other motor terminal, means controlled by the operation of said electric motor for closing said motor switch after said motor has started to operate and for maintaining said motor switch closed for a predetermined motor operating time after which said motor switch resumes its normal open position, said motor being adapted to drive a load to be cycled and said system being adapted to be electrically energized by connecting a power source to said stationary thermostat contact of the first pair of contacts and the one terminal of said motor winding and a connection between said other terminal of the heater winding to the system terminal, said thermostatic switch having for the first pair of contacts an operating period for opening the switch contacts after the heater has been energized which is shorter than the closure time of the motor controlled switch contacts.

10. The system according to claim 9 wherein said connection between said other heater terminal and said system terminal includes a variable resistor for controlling the operating period of the thermostatic switch.

11. The system according to claim 10 wherein means are provided for manually completing a circuit across the motor controlled switch contacts whereby a motor operating cycle may be initiated manually independently of the thermostatic switch contacts.

No references cited.